(12) United States Patent
Olgaard

(10) Patent No.: US 9,319,154 B2
(45) Date of Patent: Apr. 19, 2016

(54) METHOD FOR TESTING MULTIPLE DATA PACKET SIGNAL TRANSCEIVERS WITH A SHARED TESTER TO MAXIMIZE TESTER USE AND MINIMIZE TEST TIME

(71) Applicant: LITEPOINT CORPORATION, Sunnyvale, CA (US)

(72) Inventor: Christian Volf Olgaard, Saratoga, CA (US)

(73) Assignee: LITEPOINT CORPORATION, Sunnyvale, CA (US)

( * ) Notice: Subject to any disclaimer, the term of this patent is extended or adjusted under 35 U.S.C. 154(b) by 140 days.

(21) Appl. No.: 14/256,095

(22) Filed: Apr. 18, 2014

(65) Prior Publication Data

US 2015/0304864 A1    Oct. 22, 2015

(51) Int. Cl.
    *H04B 17/00*        (2015.01)
(52) U.S. Cl.
    CPC ..................... *H04B 17/00* (2013.01)
(58) Field of Classification Search
    None
    See application file for complete search history.

(56) References Cited

U.S. PATENT DOCUMENTS

| | | |
|---|---|---|
| 2005/0149800 A1 | 7/2005 | Jones et al. |
| 2008/0172588 A1 | 7/2008 | Olgaard |
| 2010/0261431 A1* | 10/2010 | Olgaard ........... G01R 31/31713 455/67.11 |
| 2011/0057673 A1 | 3/2011 | Iwamoto et al. |
| 2011/0292809 A1* | 12/2011 | Olgaard .................. H04L 43/50 370/241 |
| 2012/0231744 A1 | 9/2012 | Gregg et al. |
| 2012/0231745 A1* | 9/2012 | Gregg .................. H04B 17/309 455/67.12 |
| 2013/0237216 A1* | 9/2013 | Ong ....................... H04W 24/10 455/434 |
| 2014/0281595 A1* | 9/2014 | Baker ....................... G06F 1/30 713/300 |

OTHER PUBLICATIONS

International Search Report and Written Opinion filed in PCT/US2015/019111 mailed on May 29, 2015; 12 pages.
U.S. Appl. No. 14/017,041, filed Sep. 3, 2013, "Method for Testing Data Packet Signal Transceivers Using Interleaved Device Setup and Testing."
U.S. Appl. No. 14/017,077, filed Sep. 3, 2013, "Method for Testing Data Packet Signal Transceivers With Multiple Radio Access Technologies Using Interleaved Device Setup and Testing."
U.S. Appl. No. 13/972,280, filed Aug. 21, 2013, "Method for Testing Data Packet Signal Transceiver Using Coordinated Transmitted Data Packet Signal Power."
U.S. Appl. No. 14/082,378, filed Nov. 18, 2013, "System and Method for Data Packet Transceiver Testing After Signal Calibration and Power Settling to Minimize Test Time."

* cited by examiner

*Primary Examiner* — Derrick Ferris
*Assistant Examiner* — Jay Vogel
(74) *Attorney, Agent, or Firm* — Vedder Price, P.C.

(57) ABSTRACT

Methods for testing multiple data packet signal transceiver devices under test (DUTs) with a shared tester. The DUTs transmit their data packet signals until predetermined numbers of data packets have been transmitted or predetermined time intervals expire, following which, each DUT awaits a synchronization request to begin transmitting data packets to the tester. Alternatively, the tester determines when its receiver is available for receiving data packets, following which, synchronization requests are sent to respective DUTs to initiate their transmissions of data packets to the tester. Further alternatively, power levels among data packets initially transmitted from the DUTs are monitored to determine when they are indicative of them having settled. As each DUT data packet signal power settles, a status signal indicating the settled nature of each DUT is provided to the tester which then begins receiving the respective DUT data packet signals, as they settle in power, for analysis.

4 Claims, 7 Drawing Sheets

METHOD FOR TESTING MULTIPLE DATA PACKET SIGNAL TRANSCEIVERS WITH A SHARED TESTER TO MAXIMIZE TESTER USE AND MINIMIZE TEST TIME

BACKGROUND

The present invention relates to testing multiple data packet signal transceiver devices under test (DUTs), and in particular, to testing multiple DUTs with a shared tester to maximize tester use and thereby minimize test time.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When designing such wireless devices, engineers take extra care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

During testing of data packet signals sent by a DUT to a tester, the packets initially transmitted, e.g., when an otherwise properly operating DUT transmitter first begins transmitting, its power will vary, increasing and decreasing until it "settles" to the intended nominal power, with any further power variations normally deemed to be insignificant. At that time, after settling, the tester then begins capturing data packets for analysis. Earlier data packets captured during the settling time are essentially ignored for purposes of the analysis. However, their capturing nonetheless ties up capture and analysis resources of the tester. Thus, from a tester utilization perspective, the analysis functions of the tester remain idle during the transmitter power settling interval, and thus detracts from overall tester utilization.

Current attempts to optimize tester use during testing will often predefine a test step sequence that a DUT will execute during a test, usually based on either signal transmission time or number of transmitted data packets. Consequently, the DUT will only execute a given test sequence for a predetermined time interval. When trying to test multiple DUTs contemporaneously, e.g., in parallel, one needs to design the test sequence to allow DUT performance to be analyzed in a worst case scenario where all DUTs request access to hardware at the same point in time. However, in most cases such a worst-case scenario will not occur, though all DUTs continue to execute their test sequences to satisfy the worst-case scenario. Hence, proportionally, a significant amount of test time is unproductive as the tester captures data packets unsuitable for analysis.

SUMMARY

In accordance with the presently claimed invention, methods are provided for testing multiple data packet signal transceiver devices under test (DUTs) with a shared tester. The DUTs transmit their data packet signals until predetermined numbers of data packets have been transmitted or predetermined time intervals expire, following which, each DUT awaits a synchronization request to begin transmitting data packets to the tester. Alternatively, the tester determines when its receiver is available for receiving data packets, following which, synchronization requests are sent to respective DUTs to initiate their transmissions of data packets to the tester. Further alternatively, power levels among data packets initially transmitted from the DUTs are monitored to determine when they are indicative of them having settled. As each DUT data packet signal power settles, a status signal indicating the settled nature of each DUT is provided to the tester which then begins receiving the respective DUT data packet signals, as they settle in power, for analysis.

In accordance with one embodiment of the presently claimed invention, a method for testing multiple data packet signal transceiver devices under test (DUTs) with a shared tester includes preparing each one of a plurality of DUTs for transmit signal (TX) testing by:

initiating at least partially contemporaneous transmissions of respective initial pluralities of DUT data packets from a plurality of DUTs;

terminating each one of the transmissions of respective initial pluralities of DUT data packets from the plurality of DUTs following at least one of transmission of a respective predetermined plurality of DUT data packets, or a respective predetermined time interval; and initiating further at least partially contemporaneous transmissions of DUT data packets by one or more of the plurality of DUTs from which the transmission of a respective initial plurality of DUT data packets has been terminated following at least one of reception of a synchronization request signal, or another respective predetermined time interval.

In accordance with another embodiment of the presently claimed invention, a method for testing multiple data packet signal transceiver devices under test (DUTs) with a shared tester includes:

following confirmation of availability of data packet signal receiver circuitry of a tester to receive a DUT data packet signal, conveying a synchronization request signal to one of a plurality of DUTs;

waiting for at least the first to occur of reception of a response data packet signal responsive to the synchronization request signal, or expiration of a response time interval for reception of the response data packet signal;

following a failure to receive the synchronization confirmation signal prior to the expiration of the response time interval, conveying another synchronization request signal to another one of the plurality of DUTs, and repeating the waiting; and following a successful reception of a response data packet signal prior to the expiration of the response time interval, receiving, with the tester, a DUT data packet signal from the one of the plurality of DUTs from which the response data packet signal was received prior to the expiration of the response time interval.

In accordance with another embodiment of the presently claimed invention, a method for testing multiple data packet signal transceiver devices under test (DUTs) with a shared tester includes:

receiving at least one status signal indicative of power variations among data packets within each one of a plurality of DUT data packet signals from a plurality of DUTs;

following confirmation of availability of data packet signal receiver circuitry of a tester to receive a DUT data packet signal, and reception of the at least one status signal being indicative of a power variation less than a first variation among data packets within a DUT data packet signal from a first one of the plurality of DUTs, performing at least one of
    conveying a first synchronization request signal to the first one of the plurality of DUTs, or
    receiving, with the tester, the DUT data packet signal from the first one of the plurality of DUTs; and
following the reception of the DUT data packet signal from the first one of the plurality of DUTs, and reception of the at least one status signal being indicative of a power variation less than a second variation among data packets within a DUT data packet signal from a second one of the plurality of DUTs, performing at least one of
    conveying a second synchronization request signal to the second one of the plurality of DUTs, or
    receiving, with the tester, the DUT data packet signal from the second one of the plurality of DUTs.

DETAILED DESCRIPTION

Figure 1:
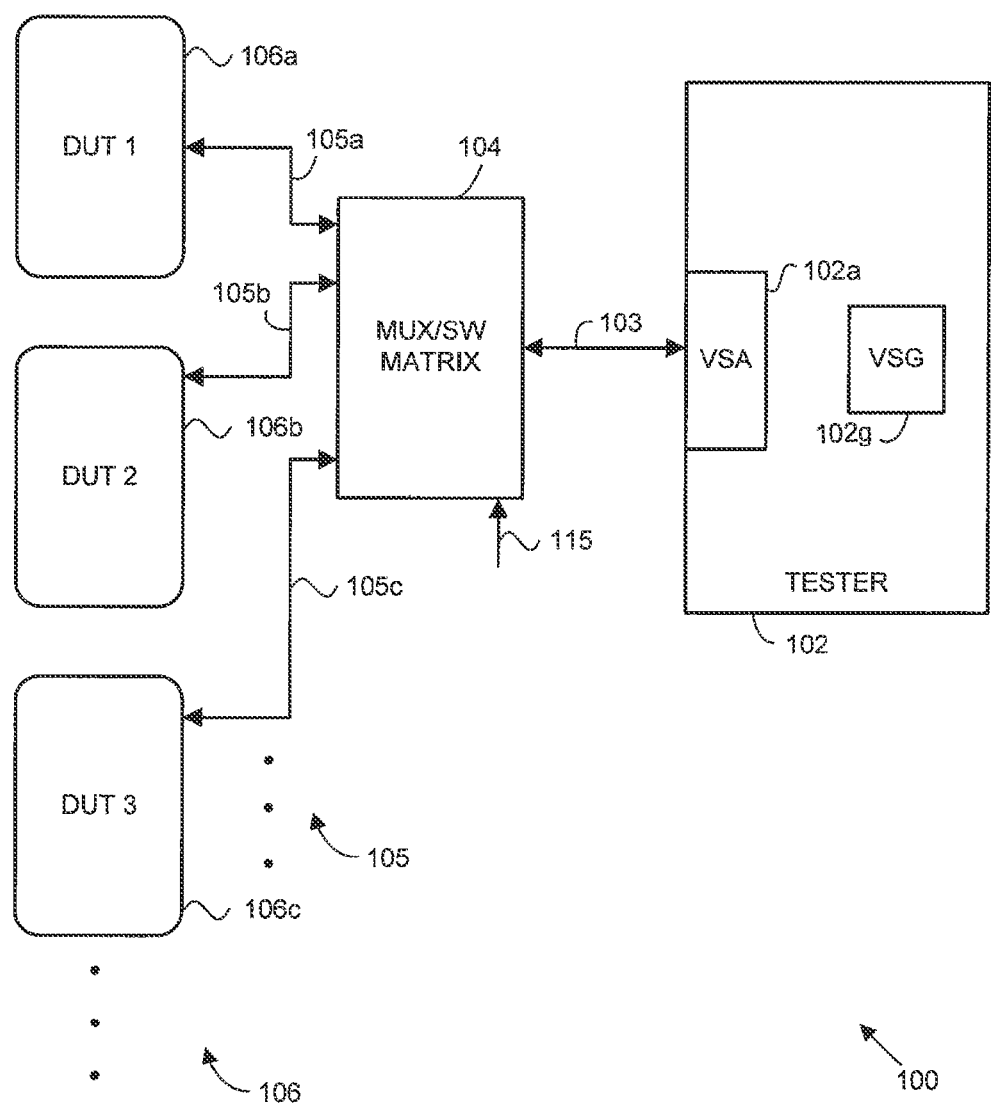
FIG. 1 depicts a testing environment for testing multiple DUTs in accordance with exemplary embodiments of the presently claimed invention.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

As discussed in more detail below, data packet tester utilization is maximized and test time is minimized by avoiding use of tester resources, e.g., the receiver circuitry for capturing data packets for analysis, during the time that signal power levels of data packets transmitted by the DUTs (in predetermined sequences, e.g., in terms of numbers of packets or packet transmission time intervals) are settling to their intended nominal power levels. Hence, as transmitted power levels of other DUT data packets settle, data packets now being transmitted by a DUT whose output has already settled are received for capturing and analysis. Accordingly, the disclosed methods provide for separating or otherwise distinguishing between intervals during which DUT data packets are settling (in terms of transmitted signal power) before being received for capture and analysis. This ensures that the tester receiver circuitry used for capturing and analysis of data packets is used for those data packets (in sequences, as noted) for which the transmitted data packet signal power has already settled, concurrent with one or more other DUTs completing their respective transmitted signal power settling time intervals, during which their data packets are not received for capture and analysis.

Referring to FIG. 1, in accordance with exemplary embodiments, a testing environment 100 for testing multiple DUTs includes a tester 102, signal routing circuitry 104 (e.g., multiplexor or switch matrix circuitry) and the DUTs 106. (For purposes of this discussion, testing is discussed in the context of three DUTs being tested contemporaneously, or in parallel, though it will be understood that the number of DUTs can be more or fewer as desired.)

Signal paths 103, 105 between the tester 102, routing circuitry 104 and DUTs 106 are provided, typically in the form of conductive signal paths implemented using controlled impedance radio frequency (RF) cables and connectors (e.g., co-axial,). During transmit (TX) signal testing, data packet signals from the DUTs 106 are conveyed via the signal paths 105 to the routing circuitry 104, which routes (e.g., multiplexes or switches) the desired or selected signal via the signal path 103 to the tester 102. Such signal routing is controlled in accordance with one or more control signals 115, which can be provided by the tester 102 or another control signal source (not shown) external or remote from the tester 102, such as a personal computer. The routed data packet signal is received by the tester 102 using receiver circuitry 102a, e.g., in the form of a vector signal analyzer (VSA), where the data packets are captured for analysis.

During receive (RX) signal testing, a data packet signal is provided by a signal source 102g within the tester 102, e.g., in the form of a vector signal generator (VSG). This signal is conveyed via the signal path 103 to the router circuitry 104, which routes the signal to the desired DUT 106a, 106b, 106c, . . . .

Figure 2:
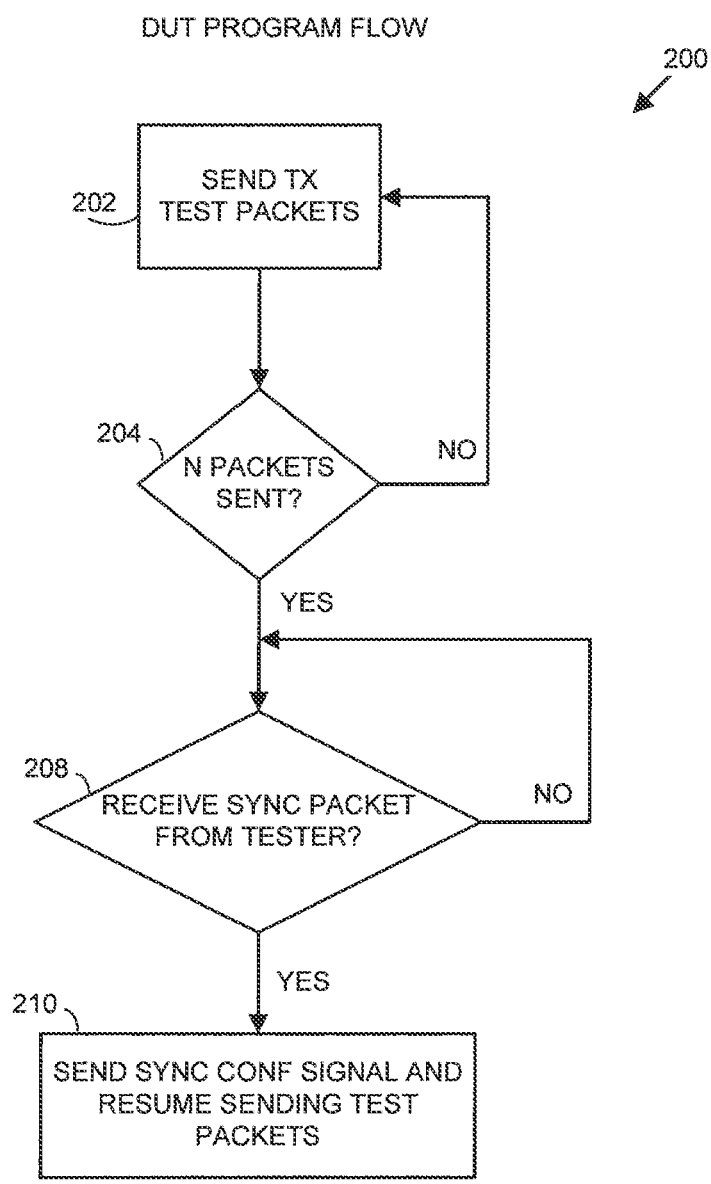
FIG. 2 depicts a flowchart representing a test flow in accordance with exemplary embodiments of the presently claimed invention.

Referring to FIG. 2, in accordance with exemplary embodiments, test flow 200 for testing each one of multiple DUTs 106 can proceed as shown, with each being tested as part of a concurrent test sequence by performing each of the depicted steps. Initially, each DUT will initiate transmission of its data packets 202. It is then determined 204 whether a prescribed number of data packets have been sent, or, alternatively, whether a prescribed time interval has elapsed or expired. If not, transmission of data packets continues 202. However, if the prescribed number of data packets has been transmitted, or the prescribed time interval has elapsed, the DUT awaits 208 reception of a synchronization request signal from the tester. Following reception of such synchronization request signal, the DUT may respond by transmitting a synchronization confirmation signal 210, and resumes transmitting test data packets for reception, capture and analysis by the tester.

Figure 3:
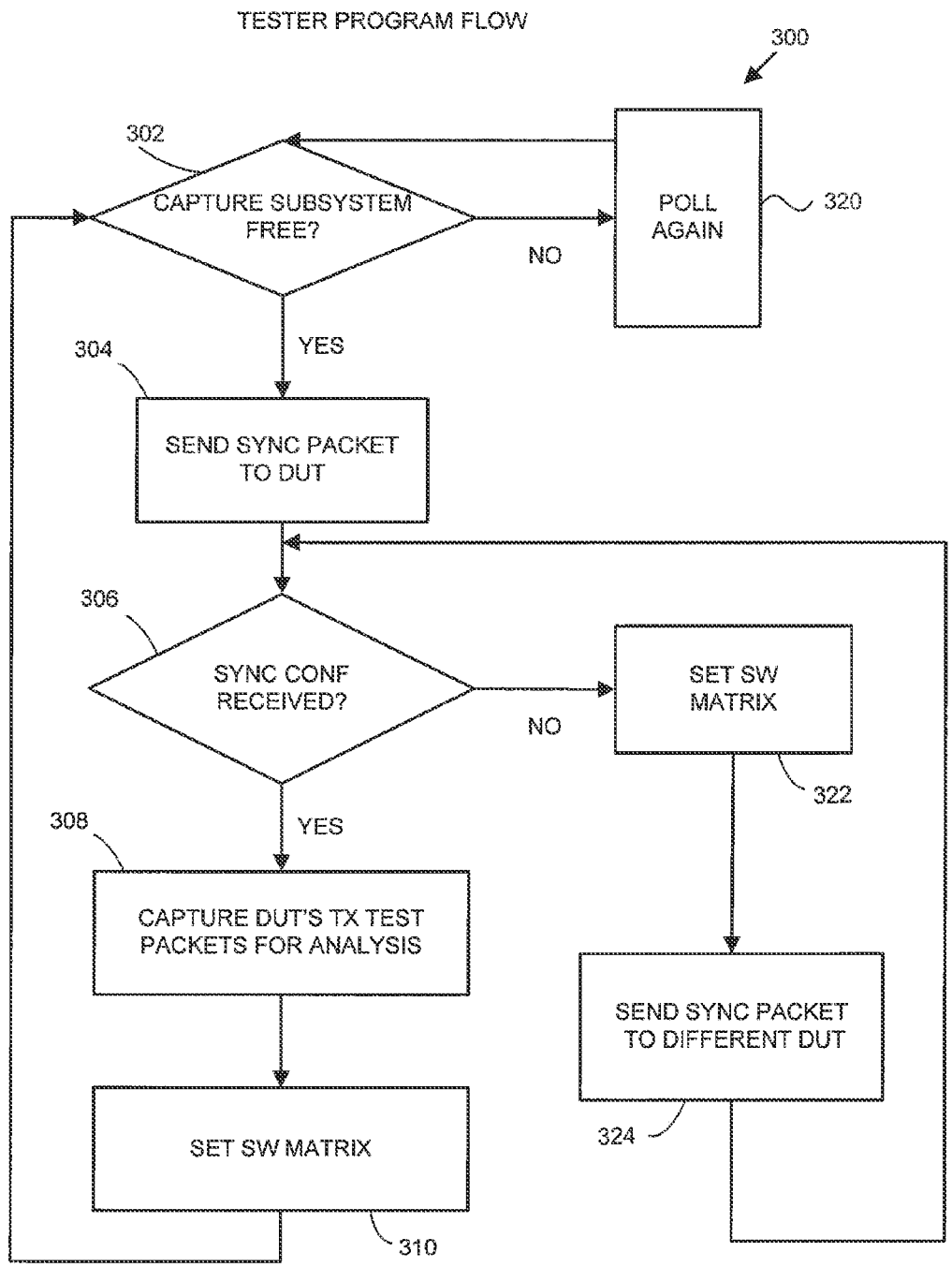
FIG. 3 depicts a flowchart representing a test flow in accordance with further exemplary embodiments of the presently claimed invention.

Referring to FIG. 3, in accordance with further exemplary embodiments, program flow 300 from the perspective of the tester 102 can proceed as shown. Initially, the tester determines 302 whether the signal reception circuitry (e.g., the VSA) is available to receive a data packet signal for capture and analysis. If not, the receiver circuitry continues to be monitored 320 for its availability. After it becomes available, the tester transmits a synchronization request signal 304 to a selected DUT. The tester then waits during a response time interval 306 for reception of a synchronization confirmation signal from the DUT to which the synchronization request signal was conveyed. Alternatively, tester waits during a predetermined response time interval 306 for reception of data packets from the DUT. If no synchronization confirmation signal is received, or if no data packets are received from the DUT within the predetermined response time interval, the routing circuitry is set 322 to select another DUT (i.e., to convey signals between the tester and selected DUT), following which another synchronization request signal is transmitted 324 to such selected DUT.

Following reception of a synchronization confirmation signal from a DUT, the tester begins receiving data packets 308 from the DUT with which synchronization has been established for capture and analysis. Following completion of such reception of data packets from the selected DUT, the routing circuitry is again set 310 to select another DUT, following which, the tester again checks for availability 302 of the receiver circuitry following its prior use for reception of data packets from the previous DUT.

Figure 4:
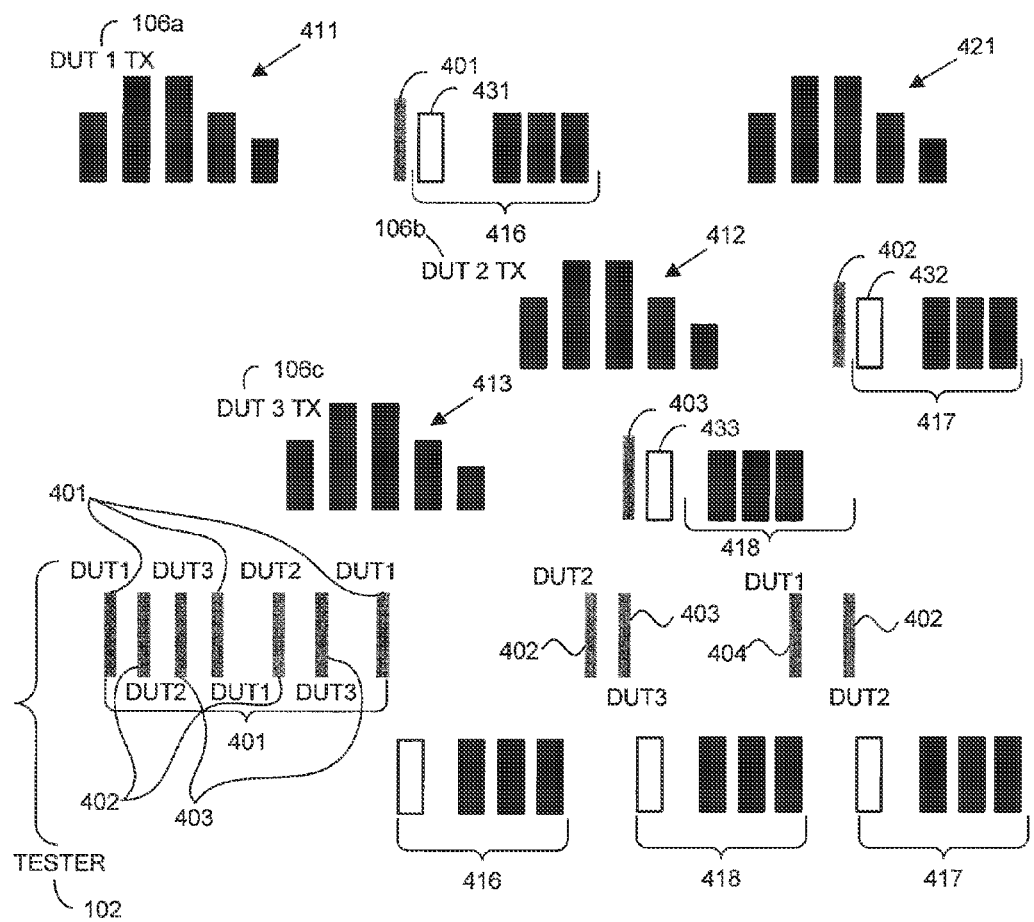
FIG. 4 depicts synchronization signal exchanges and data packet transmissions between multiple DUTs and a shared tester in accordance with exemplary embodiments of the presently claimed invention.

Referring to FIG. 4, in accordance with exemplary embodiments, interaction of signals between the tester and multiple DUTs (e.g., in the testing environment 100 of FIG. 1) begins with the DUTs 106a, 106b, 106c transmitting initial data packets 411, 412, 413 (in sequences, as noted above) during their respective power settling time intervals. The point in time that each DUT 106a, 106b, 106c begins transmitting is based upon completion of its prior transmission, and thus is at least somewhat random. Meanwhile, the tester 102 seeks to initiate test flow by transmitting multiple synchronization request signals 400, e.g., by sending synchronization request signals 401, 402, 403 in a round-robin manner to the respective DUTs 106a, 106b, 106c pending their completion of signal power settling.

As shown, signal power for the first DUT 106a is the first to be considered settled (e.g., the DUT 106a has completed transmission of a predetermined number of data packets following which power settlement is presumed). Accordingly, in response to its synchronization request signal 401 received from the tester 102 following its power settling, the first DUT 106a responds with a synchronization confirmation signal 431, following which, its subsequently transmitted data packets 416 are received and captured by the tester 102.

Following completion of its capture of the data packets 416, the tester 102 resumes transmission of synchronization request packets 402, 403 for the second 106b and third 106c DUTs. By then, signal power levels for the second DUT 106b have not yet settled. However, power levels for the third DUT 106c have reached a state to be considered settled, so it responds to its synchronization request signal 403 from the tester 102 by transmitting, in response, synchronization confirmation signal 433, following which its subsequently transmitted data packets 418 are received and captured by the tester 102.

Following completion of its capture of these data packets 416, the tester 102 resumes transmission with another synchronization request packet 404 for the first DUT 106a. However, the first DUT 106a has started another packet sequence 421 for which its signal power levels for have not yet settled. Meanwhile, though, signal power levels for the second DUT 106b have reached a state to be considered settled. Accordingly, it responds to its synchronization request signal 402 from the tester 102 by transmitting, in response, a synchronization confirmation signal 432, following which, its subsequently transmitted data packets 417 are received and captured by the tester 102.

The synchronization request packets 401, 402, 403, 404, . . . can be transmitted at different frequencies, as desired, in accordance with their respective positions in the overall test flow for the different DUTs 106.

Figure 5:
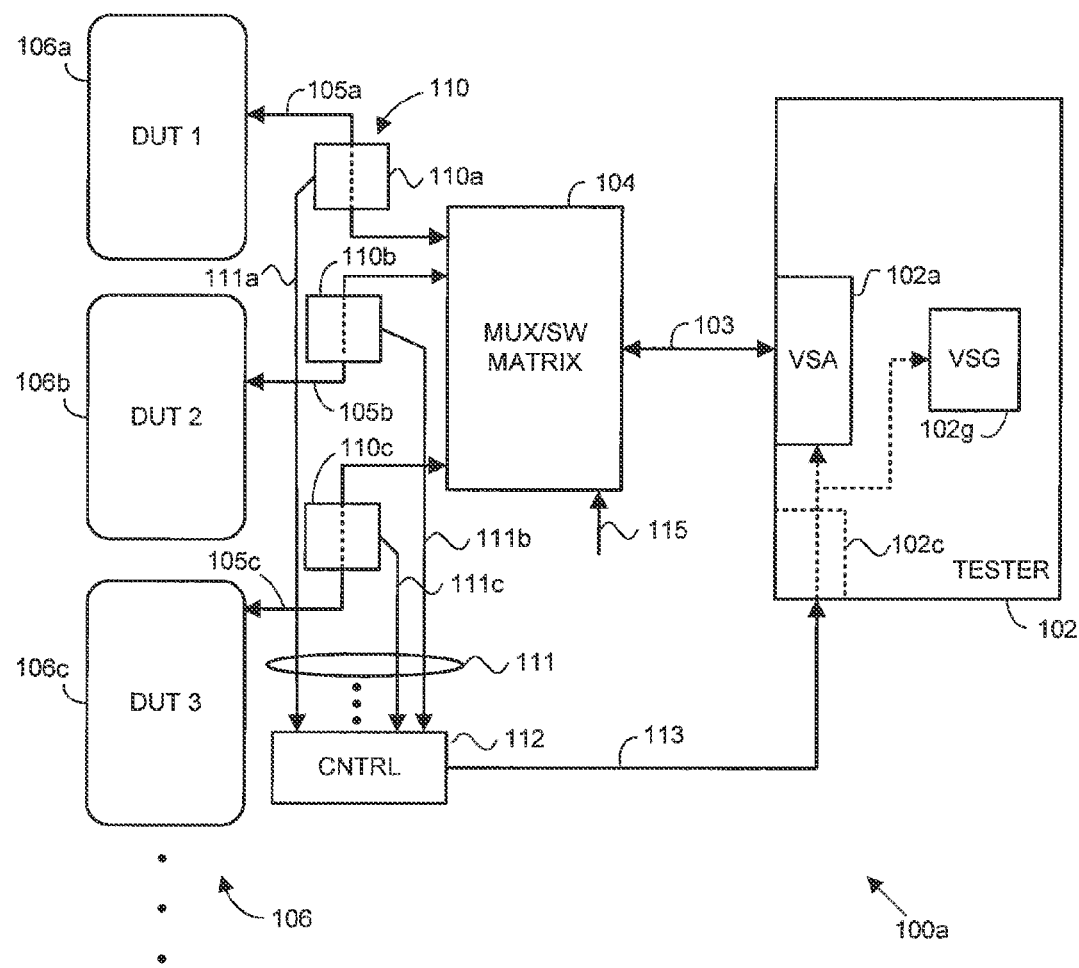
FIG. 5 depicts a testing environment for testing multiple DUTs in accordance with further exemplary embodiments of the presently claimed invention.

Referring to FIG. 5, a testing environment 100a in accordance with further exemplary embodiments includes power detection, or measurement, circuits 110 disposed between the routing circuitry 104 and DUTs 106. The respective power detectors 110a, 110b, 110c detect, or measure, the power levels (e.g., by sampling individual peak data packet signal levels) of the data packet signals beings transmitted by the corresponding DUTs 106a, 106b, 106c via the signal paths 105a, 105b, 105c to the routing circuitry 104. The power detectors 110 each provide one or more data signals 111a, 111b, 111c indicative of the individual DUT data packet signal powers. These data signals 111a, 111b, 111c are processed by control circuitry 112 to provide one or more control signals 113 to the tester 102. These control signals 113 can be conveyed directly to the receiver circuitry 102a or the signal generator circuitry 102g, or both, or can be further processed by internal control circuitry 102c within the tester 102 prior to use in controlling one or both of the receiver 102a and generator 102g circuitry. These detected power level signals 111 can be used, via the control signals 113 to the tester 102, to inform the tester 102 whether and when the data packet signal power from each DUT 106a, 106b, 106c has settled.

Alternatively, the power detectors 110a, 110b, 110c can be used to detect the respective data packets, in which case the data signals 111a, 111b, 111c can be indicative of the number of data packets that have been transmitted by the respective DUTs 106a, 106b, 106c. Based upon a priori knowledge of the power settling characteristics of the DUTs 106 (e.g., empirical test data of similar DUTs known to be good), the data signals 111a, 111b, 111c will then also be indicative of whether and when the power levels of the data packets transmitted by the respective DUTs 106a, 106b, 106c have settled. In turn, these signals will also be indicative of the states of readiness on the part of the respective DUTs 106a, 106b, 106c to be responsive to synchronization requests.

Additionally, data packet detection capabilities of the power detectors 110a, 110b, 110c can be advantageously used to enable more informed planning for and uses of the tester 102 resources. For example, the data signals 111a, 111b, 111c can be monitored to identify when flows of data packets from the respective DUTs 106a, 106b, 106c begin and end, and thereby enable real time determinations of whether and when the tester 102 should be capturing data packets with the receiver circuitry 102a or providing test data packets with the signal source 102g, depending upon requirements of the test currently being performed or scheduled to be performed.

Figure 6:
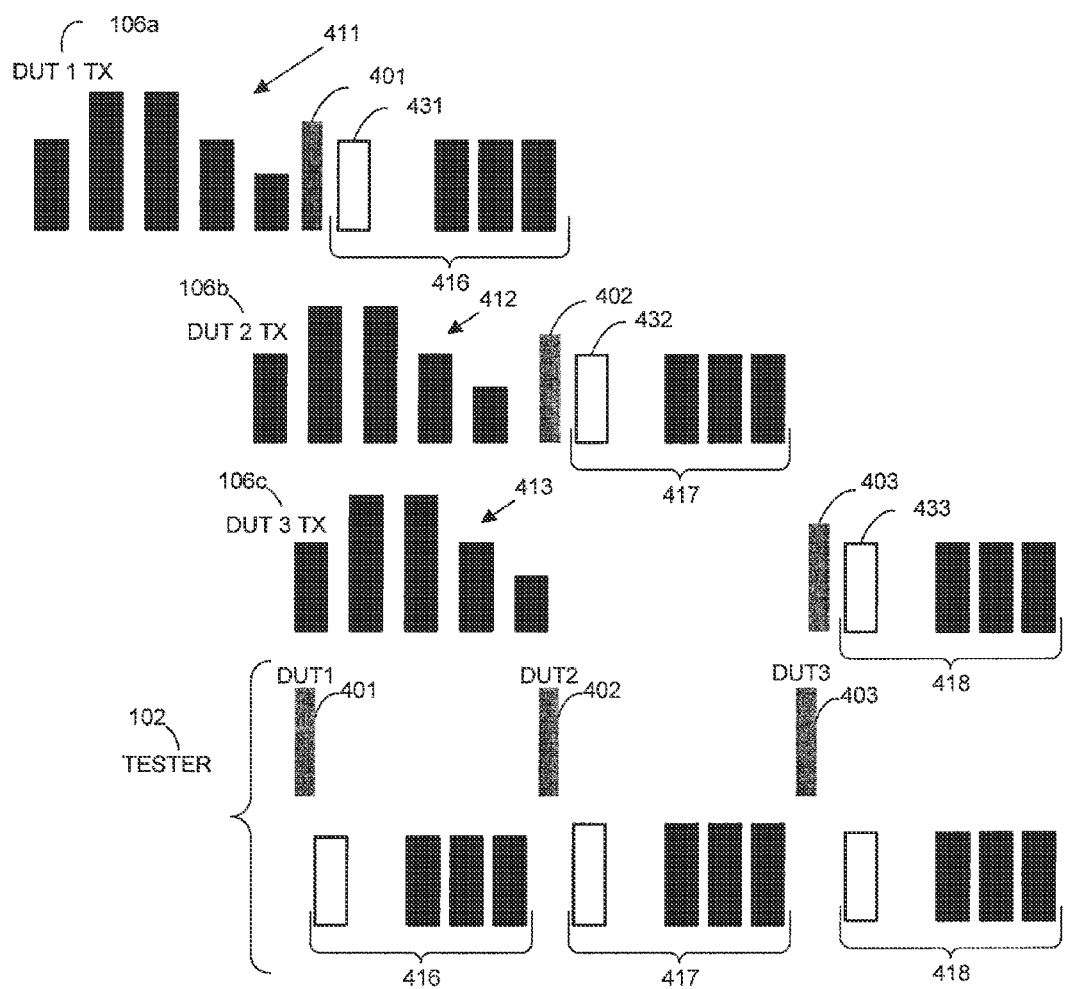
FIG. 6 depicts synchronization signal exchanges and data packet transmissions between multiple DUTs and a shared tester in accordance with further exemplary embodiments of the presently claimed invention.

Referring to FIG. 6, in accordance with exemplary embodiments, interactions of data packet signals between the tester 102 and DUTs 106 in the testing environment 100a of FIG. 5 can occur as shown. The power detectors 110a, 110b, 110c can determine when predetermined numbers of data packets have been transmitted by the respective DUTs 106a, 106b, 106c, following which, synchronization request packets are transmitted. For example, the first power detector 110a monitors the data packet stream transmitted by its associated DUT 106a, and when the expected number of data packets 411 have been transmitted, the control circuitry 112 initiates scheduling of a synchronization request packet 401 for transmission by the DUT 106a. Similarly, when the second DUT 106b completes transmission of its expected number of data packets 412, the control circuitry 112 initiates scheduling of a synchronization request packet 402 for transmission by the DUT 106b. However, as depicted in the figure, the tester 102 is receiving and capturing data packets 416 from the first DUT 106a, and is, therefore, currently unavailable for communications with the second DUT 106b. Accordingly, transmission of the second synchronization request packet 402 is delayed until completion of the capturing of data packets 416 from the first DUT 106a. Monitoring of data packets 413 from the third DUT 106c, capturing of data packets 417 from the second DUT 106b, and delaying of transmission of the synchronization request packet 403 from the third DUT 106c are similarly performed.

Figure 7:
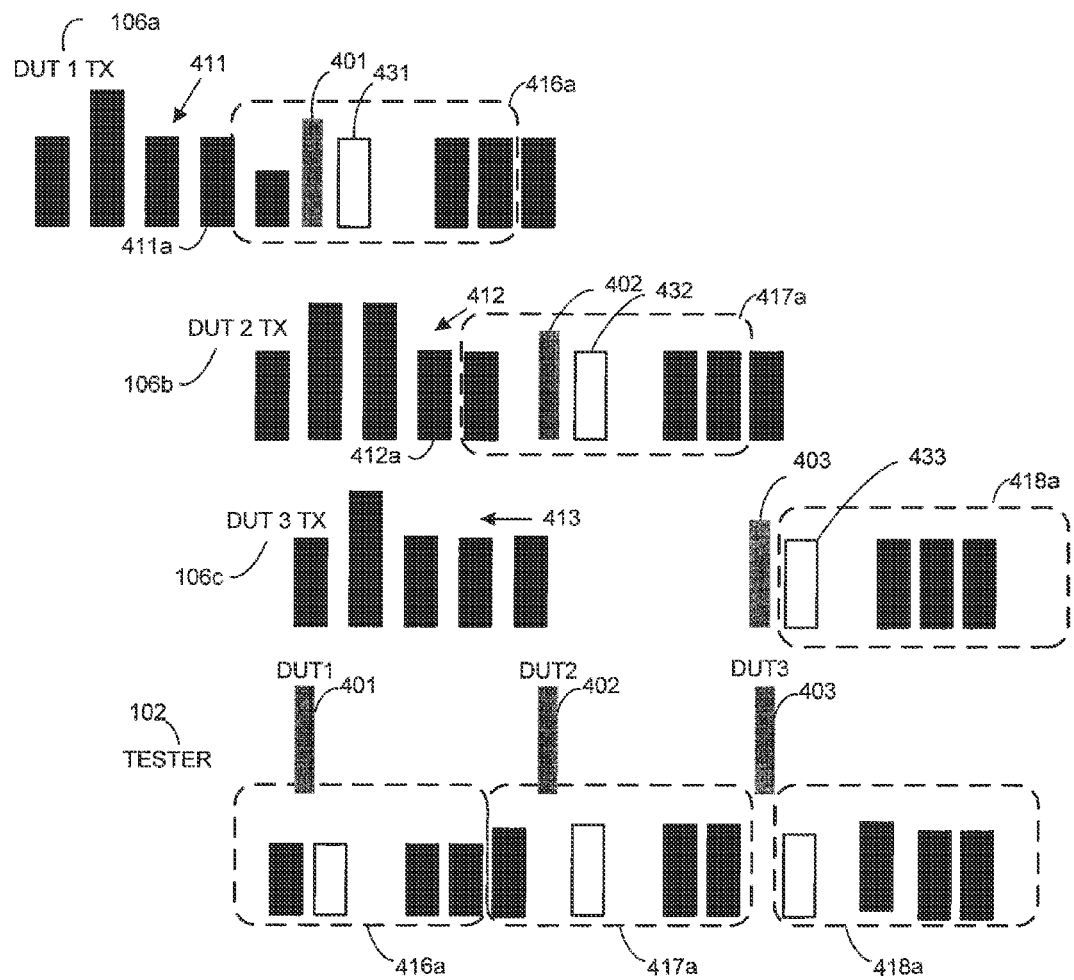
FIG. 7 depicts synchronization signal exchanges and data packet transmissions between multiple DUTs and a shared tester in accordance with further exemplary embodiments of the presently claimed invention.

Referring to FIG. 7, in accordance with further exemplary embodiments, e.g., again when testing in the environment 100a of FIG. 5, alternative signal interactions can occur as shown. For example, the power levels of the data packets 411 from the first DUT 106a may settle more quickly, e.g., as of the next-to-last data packet 411a of the data packet sequence 411. This is detected by the corresponding power detector 110a, which signals 111a to the tester 102 that data packet reception and capture can begin. Accordingly, the tester 102 begins receiving and capturing data packets 416a prior to the exchange of the synchronization request 401 and synchronization confirmation 431 signals. Accordingly, one or more trailing packets of the initial sequence 411 of data packets may be captured, as well as the synchronization confirmation 431 packet, and one or more of the trailing data packets 416 subsequently transmitted may not be captured.

Similarly, this may happen with another DUT 106b for which transmitted power has settled as of the next-to-last data packet 412a, again, prior to the exchange of the synchronization request 402 and synchronization confirmation 432 signals. As before, this may result in receiving and capturing one or more trailing packets of the initially transmitted data packets 412 and failure to receive and capture one or more trailing packets of the subsequently transmitted data packets 417.

Meanwhile, notwithstanding a similar early settling of power levels of the data packets 413 from the remaining DUT 106c, exchange of the synchronization request 403 and synchronization confirmation 433 signals occurs later, e.g., due to the unavailability of the receiver circuitry of the tester 102 during reception and capture of data packets from the second DUT 106b. Accordingly, reception and capture of data packets 418a from the third DUT 106c occurs without also receiving and capturing one or more trailing packets of the initially transmitted data packets 413.

Alternatively, the test environment 100a can be programmed or otherwise controlled such that, following availability of the receiver circuitry of the tester 102, priority for reception and capture of data packets can be based on the order in which power settling has occurred. Accordingly, in this example, since the power levels of the data packets 413 from the third DUT 106c have settled earlier than those of the data packets 412 from the second DUT 106b, the receiver circuitry of the tester 102 will synchronize with and capture packets from the third DUT 106c first.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for testing multiple data packet signal transceiver devices under test (DUTs) with a shared tester, comprising:
   receiving, with a shared tester, at least one status signal separate from and indicative of power variations among data packets within each one of a plurality of DUT data packet signals from a plurality of DUTs;
   following confirmation of availability of data packet signal receiver circuitry of said shared tester to receive a DUT data packet signal, and reception of said at least one status signal being indicative of a power settling variation less than a first variation among data packets within a DUT data packet signal from a first one of said plurality of DUTs, performing at least one of
      conveying, from said shared tester, a first synchronization request signal to said first one of said plurality of DUTs, or
      receiving, with said tester, said DUT data packet signal from said first one of said plurality of DUTs; and
   following said reception of said DUT data packet signal from said first one of said plurality of DUTs, and reception of said at least one status signal being indicative of a power settling variation less than a second variation among data packets within a DUT data packet signal from a second one of said plurality of DUTs, performing at least one of
      conveying, from said shared tester, a second synchronization request signal to said second one of said plurality of DUTs, or
      receiving, with said tester, said DUT data packet signal from said second one of said plurality of DUTs.

2. The method of claim 1, wherein at least one of said first and second variations among data packets within a DUT data packet signal comprises power variations between successive data packets.

3. The method of claim 1, wherein at least one of said first and second variations among data packets within a DUT data packet signal comprises power variations between mutually adjacent data packets.

4. The method of claim 1, wherein said receiving, with said shared tester, said DUT data packet signal from first one of said plurality of DUTs comprises receiving, with said shared tester, said DUT data packet signal from said first one of said plurality of DUTs following reception of a first synchronization confirmation signal responsive to said first synchronization request signal.

* * * * *